Nov. 14, 1950

H. H. HOLLY 2,530,062

PATTY MOLDING DEVICE

Filed March 19, 1949

Inventor:
Harry H. Holly,
By Schroeder, Merriam,
Hofgren, & Brady, Attys.

Nov. 14, 1950　　　H. H. HOLLY　　　2,530,062
PATTY MOLDING DEVICE
Filed March 19, 1949　　　　　　5 Sheets-Sheet 2

Inventor:
Harry H. Holly,
By Schroeder, Merriam,
Hofgren & Brady, Attys.

Nov. 14, 1950    H. H. HOLLY    2,530,062
PATTY MOLDING DEVICE
Filed March 19, 1949    5 Sheets-Sheet 3

Inventor:
Harry H. Holly.
By Schroeder, Merriam,
Hofgren & Brady, Attys.

Nov. 14, 1950 H. H. HOLLY 2,530,062
PATTY MOLDING DEVICE
Filed March 19, 1949 5 Sheets-Sheet 4

Inventor:
Harry H. Holly,
By Schroeder, Merriam,
Hofgren & Brady, Attys.

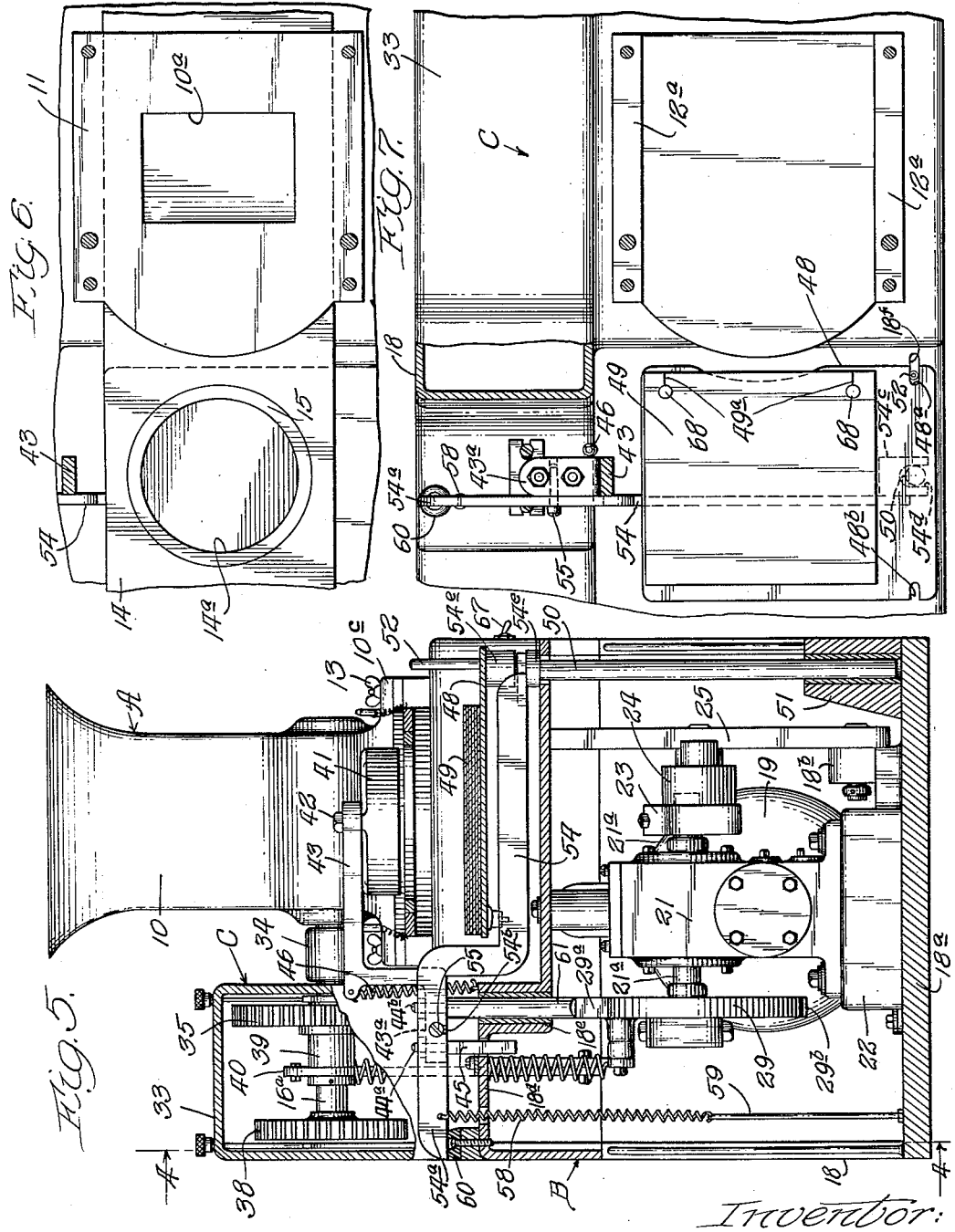

Patented Nov. 14, 1950

2,530,062

UNITED STATES PATENT OFFICE 2,530,062

PATTY MOLDING DEVICE

Harry H. Holly, Chicago, Ill., assignor to Holly Molding Devices, Inc., a corporation of Illinois Application March 19, 1949, Serial No. 82,420

14 Claims. (Cl. 17—32)

1

This invention relates to a device for molding plastic material, such as ground meat, to form articles such as meat patties, and relates particularly to such a device having an improved apparatus for shaping a portion of the plastic material to form a patty and to eject the shaped patty from the molding device.

One of the features of this invention is the provision of an improved device for molding articles from plastic material wherein there is provided a hopper for the plastic material, a mold adapted to receive a portion of material from the hopper, a plurality of supporting sheets, such as paper sheets, arranged in a stack, apparatus for transferring the portion from the mold to the topmost sheet on this stack, a back stop and apparatus for pressing the portion of material between the topmost sheet and the back stop.

Another feature of the invention is the provision of such a device wherein the portion of plastic material is transferred from the mold to a supporting member, and there is provided apparatus for moving at least one of the supporting member and back stop toward the other to press said portion therebetween, a single actuating member operatively engaging both the transferring apparatus and the moving apparatus, and a timing device provided for operating the actuating member to actuate first the transferring apparatus and then the moving apparatus.

A further feature of the invention is the provision of such a device wherein a slide plate having a mold opening is provided with the plastic material being forced into the opening and held therein together with means for moving the slide plate to a position where the mold opening is above the supporting member, and there is provided a knock-out member arranged above the opening together with apparatus for operating the knock-out member to remove the portion from the mold opening where it falls onto the supporting member, and apparatus for returning the slide plate to its first position together with apparatus for raising the supporting member to press the portion between the supporting member and said part of the mold plate to adhere said portion to a conveyor means that forms a part of said back stop.

Other features and advantages of the invention will become apparent in the following description taken in conjunction with the accompanying drawings. Of the drawings:

Fig. 1 is a side elevation of one embodiment of the device of this invention with a side plate

2 removed at the bottom thereof to expose portions of the driving mechanism.

Fig. 5 is a vertical section taken substantially along line 5—5 of Fig. 1.

Fig. 6 is a horizontal section taken substantially along line 6—6 of Fig. 1.

Fig. 7 is a section taken substantially along line 7—7 of Fig. 1.

Figure 1:
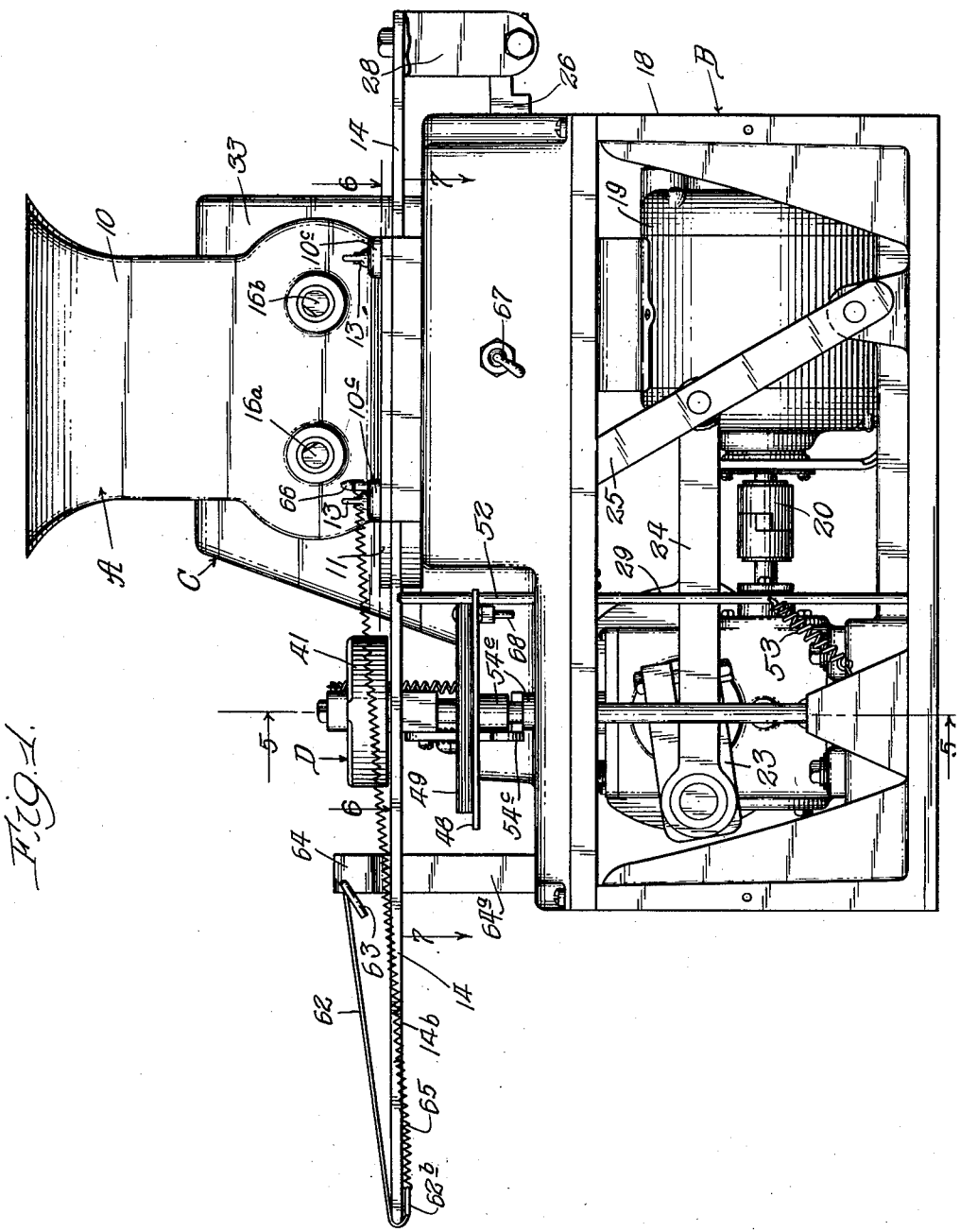
Figure 2:
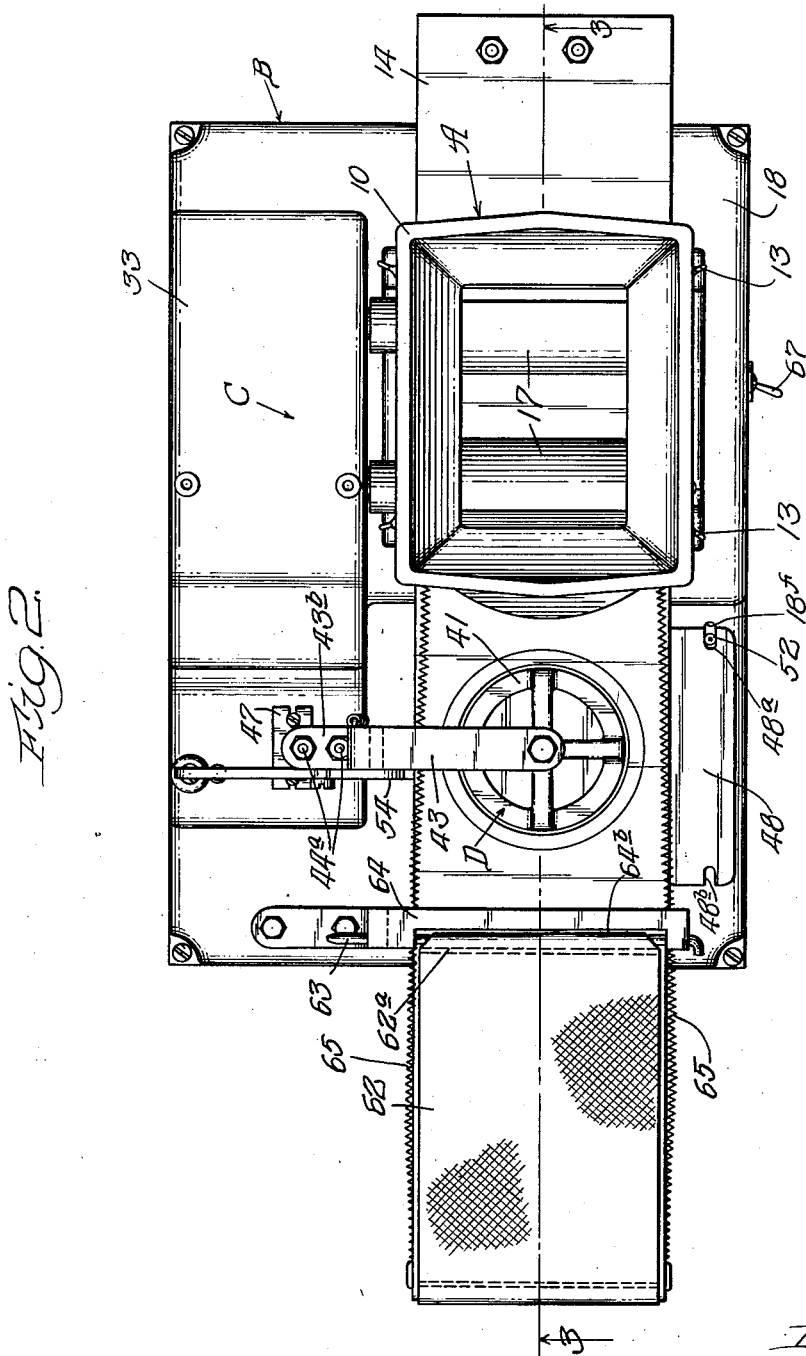
Fig. 2 is a plan view of the device.

The molding device shown and described herein may be used for molding small articles of any plastic material, but is particularly adaptable for molding wet, adhesive plastic material such as ground meat. The device may be used in molding hamburger or pork sausage patties, but any kind of ground meat or similar material can be used in the device.

The molding device shown in the accompanying drawings comprises a hopper and feed portion A, a bottom portion B, housing the driving mechanism, a gear case C mounted on the bottom portion B and arranged at one side of the hopper and feed portion A, and a molding and transfer portion D located on the bottom portion B and in front of the hopper and feed portion A.

The hopper and feed portion A comprises a hopper 10 adapted to contain a relatively large quantity of plastic material, such as ground meat, having a bottom opening 10a, with the hopper being mounted on a supporting plate 11 which in turn is held on a base 12 by wing bolts 13 engaging ears 10c located at the bottom of the hopper 10. The supporting plate 11 and base 12 have their central portions spaced from each other to provide room for a slide plate 14 arranged therebetween. This space is provided by raised side portions 12a on the base and on which the supporting plate 11 rests. The slide plate 14 has ends extending considerable distances beyond the corresponding ends of the plate 11 and base 12.

The hopper 10, supporting plate 11 and base 12 may be easily assembled and disassembled for cleaning. In order to insure the proper positioning of these members there are provided a pair of spaced posts 12b engaging holes in the side portions 12a, supporting plate 11 and hopper 10.

Figure 3:
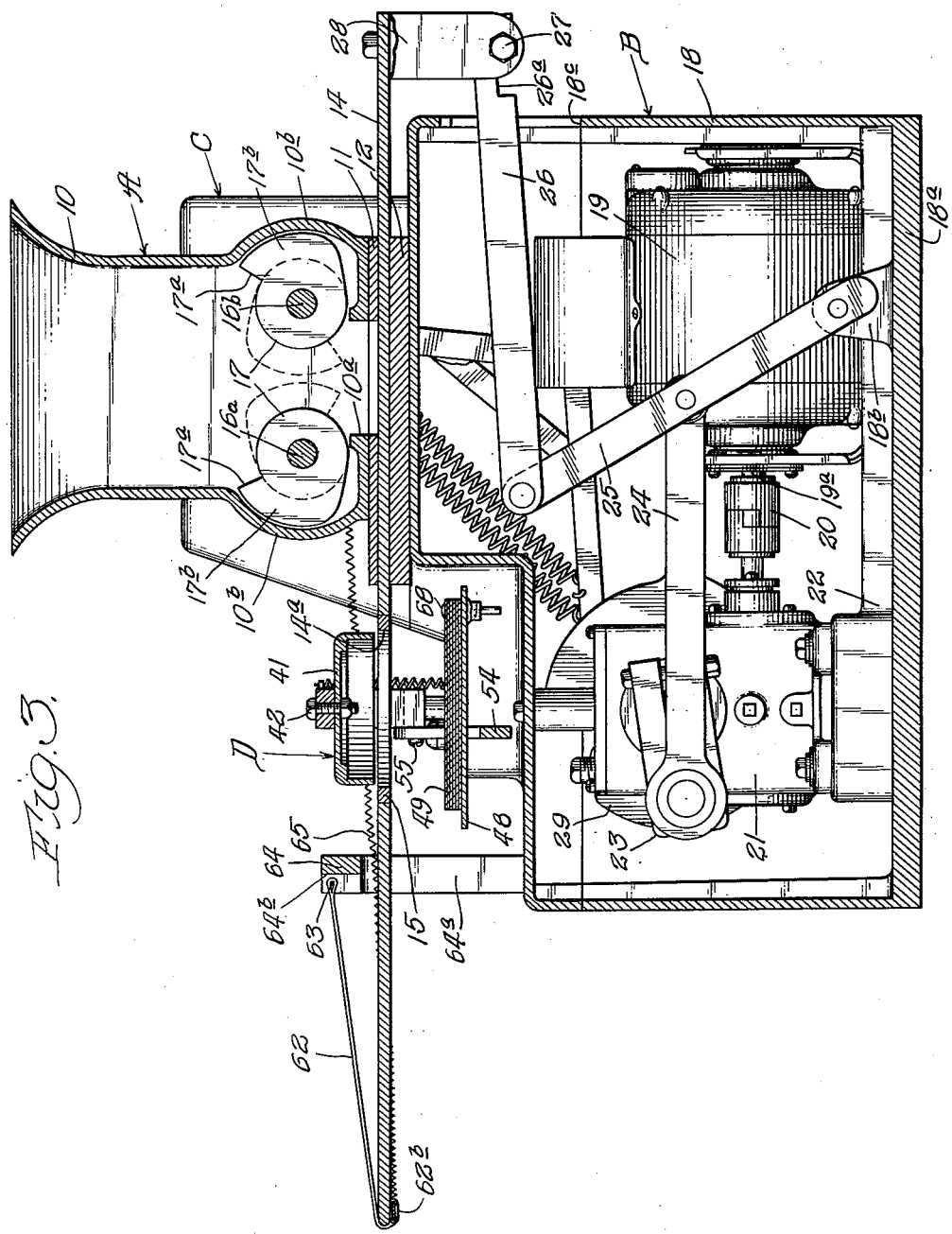
Fig. 3 is a vertical section taken substantially along line 3—3 of Fig. 2.

The slide plate 14 is provided with a mold opening 14a for receiving plastic material that is forced from the hopper through the hopper opening 10a. As shown in Fig. 3, the mold opening 14a is an opening in an annular plate 15 held in the slide plate 14. The slide plate 14 serves not only as a mold but also as a part of the transferring apparatus for transferring a portion of plastic material from the mold. One end 14b of the slide plate also serves as one part of a back stop whose function will be described hereinafter.

The sides of the hopper 10 are provided at two opposite sides thereof with rounded portions 10b each having the shape of a section of a cylinder. These rounded portions are located adjacent the bottom of the hopper 10 and on opposite sides of the hopper opening 10a. Located within the mold 10 are a pair of rotatable axles 16, 16a and 16b arranged substantially parallel to each other and above and on opposite sides of the hopper opening 10a. Mounted on each axle 16a and 16b is a feeder 17 with these feeders being rotatable with the axles 16a and 16b. Each feeder is provided with a ram portion 17a located on the periphery of the feeder. Each ram portion comprises a flat section that substantially coincides with the radius of a feeder 17. The outer surface of each feeder is substantially circular for a distance greater than 180° beginning at the base of the ram portion 17a. The surface opposite the ram portion 17a extends away from the center of the feeder and is curved to provide a protuberance 17b. As shown in Fig. 1, this protuberance is located within a rounded portion 10b when the feeder is in position with the ram portions 17a at substantially its greatest distance from the hopper opening 10a.

The bottom portion B of the molding device houses the major portion of the driving mechanism. This bottom portion is provided with a casing 18 including a bottom plate 18a. Mounted on this bottom plate is a motor 19 having a shaft 19a connected through a flexible coupling 20 to the shaft of a gear reducer 21. This gear reducer is mounted on a support 22 positioned on the bottom plate 18a and also serves to support the motor 19.

The gear reducer 21 is provided with a shaft 21a to which is attached a drive member 23 that is rotated by rotation of the shaft 21a. One end of the drive member 23 is rotatably attached to one end of an arm 24. The other end of the arm 24 is rotatably attached at substantially the midpoint of a second arm 25. This second arm has one end rotatably attached to a bracket 18b that is mounted on the bottom plate 18a of the casing 18. The other end of this arm 25 is rotatably attached to one end of a third arm 26. The opposite end of the third arm 26 is provided with a notched portion 26a on the bottom thereof which rests on and is in engagement with a bolt 27 located adjacent the bottom of a downwardly extending bracket 28 attached to the rear end of the slide plate 14. The third arm 26, which extends through an opening 18c in the casing 18, is provided with the notched portion 26a in order that a lost motion connection is provided between the third arm 26 and the slide plate 14.

Figure 4:
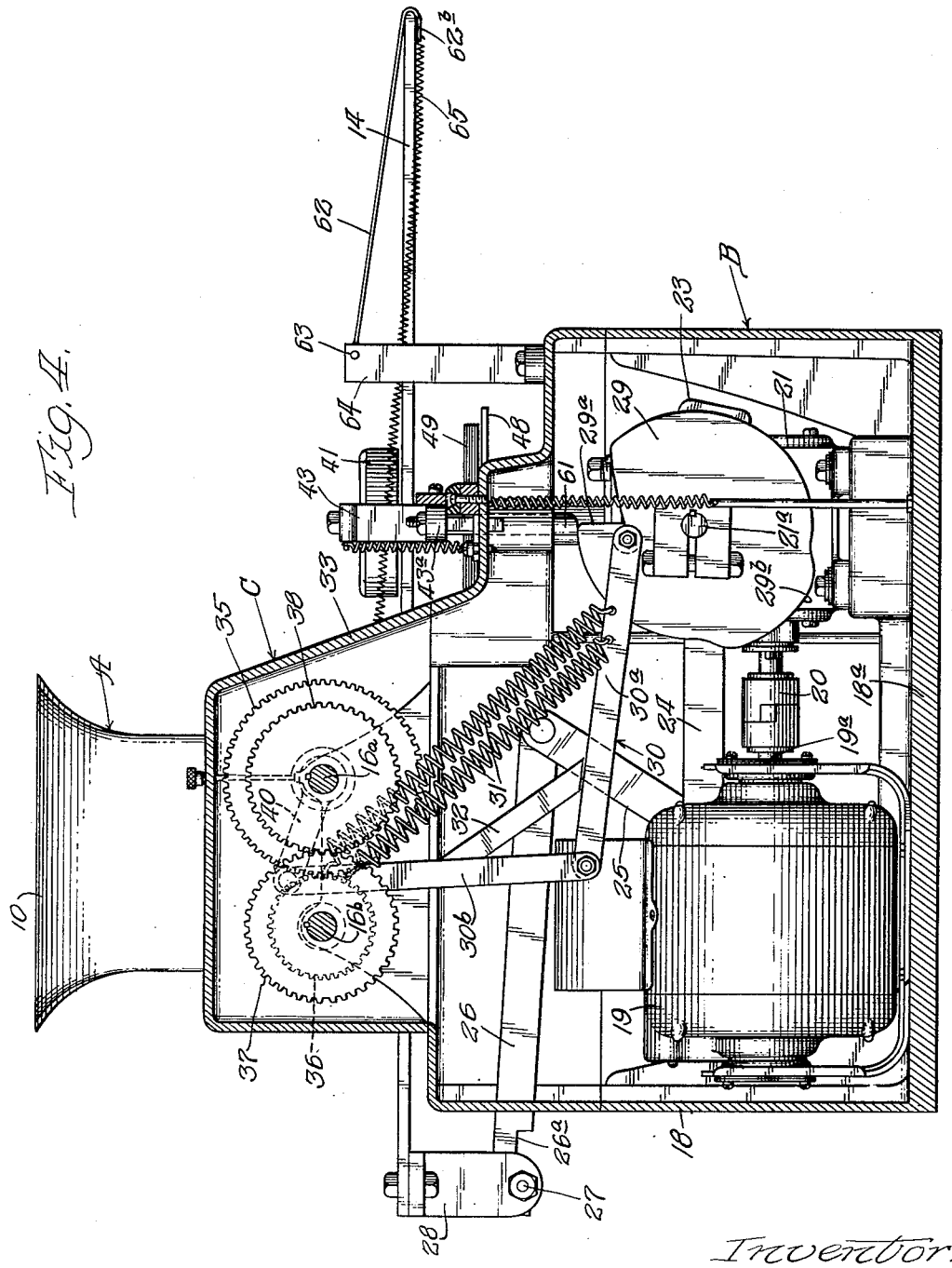
Fig. 4 is a vertical section taken substantially along line 4—4 of Fig. 5.

The end of the gear reducer shaft 21a opposite the end on which the drive member 23 is mounted has attached thereto a rotatable means such as a generally circular cam plate 29. This cam plate is provided with a depression such as a relatively deep notch 29a on one portion of its periphery and a raised portion 29b on another part of the periphery spaced less than 180° from the notch 29a. The raised portion 29b has smoothly inclined sides and a top of an arcuate shape blending into these sides. There is provided a linkage member 30 formed of two legs 30a and 30b having one end of each rotatably attached together and the opposite end of one leg 30a rotatably attached to the cam plate 29 at a point adjacent the bottom of the notch 29a. The opposite end of the other leg 30b extends up into the gear case C. The two legs 30a and 30b of the linkage member 30 are urged together by a pair of relatively heavy coil springs 31 arranged substantially parallel to each other and having their ends attached to spaced points on the legs 30a and 30b. Other types of urging means may of course be employed if desired. In these cases the springs are resistingly deformable under force. Means are provided for limiting the extent of movement of the legs 30a and 30b toward each other. As shown in Fig. 4, this limiting means comprises a stop member in the form of a bar 32 attached to one leg 30b as by welding or the like and extending to a point where its other end is abutted by the other leg 30a.

The gear case C is provided at one side of the hopper 10. This gear case comprises a removable housing 33 that is spaced from the hopper 10. The axles 16, 16a and 16b extend through the side of the hopper 10 and into the housing 33. Each axle is separable at a point between the hopper 10 and housing 33 and is held together by an annular connector 34. There is provided a first gear 35 within the housing 33 and mounted for rotation on an axle 16a. This first gear 35 is located adjacent the wall of the housing that is adjacent the hopper 10. Also within the housing, there is provided a second gear 36 mounted on the other axle 16b for rotation therewith. The first gear 35 meshes with the second gear 36 and the first gear has a circumference that is considerably greater than the circumference of the second gear. In the embodiment shown, the circumference of the first gear 35 is approximately twice the circumference of the second gear 36. Mounted on the same axle 16b which holds the second gear 36 is a third gear 37. This third gear is positioned adjacent the side of the housing that is furthest from the hopper 10. The third gear 37, which has a diameter larger than that of the second gear 36, meshes with a fourth gear 38 that is of substantially the same diameter as that of the third gear 37. This fourth gear 38 is mounted on the axle 16a which holds the first gear 35. This fourth gear 38 is rigidly fixed on the axle 16a for rotation therewith.

The first gear 35 is provided with an annular collar 39 through which the axle 16a extends, with this collar extending from the first gear 35 to a point approximately midway between gears 35 and 38. Rigidly attached to the inner end of this annular member 39 is a lever 40. When the ram portions 17a are in the position shown in Fig. 3, this lever will extend upwardly and at a small angle to the horizontal as is shown in Fig. 4. The leg 30b of the linkage member 30 that is opposite the cam plate 29 is rotatably attached to the outer end of the lever 40.

When the slide plate 14 is moved to a position so that the opening 14a is beneath the hopper opening 10a, the mold opening is filled with the plastic material from the hopper 10. The slide plate is then moved to the position shown in the drawings. In order to remove the portion of plastic material from within the mold opening 14a, there is provided a transferring apparatus. As shown, this apparatus comprises a knock-out member 41 of substantially circular shape normally positioned over the mold opening 14a, as shown in Fig. 3. This knock-out member may be of any shape desired but is generally the same shape as that of the mold opening 14a. Thus both the knock-out member and the mold opening may be circular, square, rectangular and the like. It is of course not necessarily required that the knock-out member be the same shape as the mold opening so long as the member is capable of removing the portion from the mold opening. The knock-out member is connected by means of a bolt 42 to the end of a lever such as an arm 43. This arm includes a horizontal portion to the end of which the knock-out member 41 is attached and a vertical portion extending downwardly at the side of the slide plate 14. The lower end of the arm is provided with a horizontal portion 43a. This portion is attached as by means of a bolt 44a to a downwardly extending, substantially square leg 45 extending through an opening 18d in the top of the casing 18. This leg 45 serves to guide the vertical movement of the arm 43 and the attached knock-out member 41. The arm 43 and knock-out member are urged in a downward direction by a resilient means such as coil spring 46 attached to the outer end of the arm 43 at a point between the knock-out member 41 and the leg 45. This spring has its other end attached to the top of the casing 18.

Immediately beneath the knock-out member 41 there is located a platform 48 upon which is positioned a stack 49 of sheets of paper. This platform and the paper thereon serves as a supporting member for the portion of plastic material that is removed from the mold opening 14a. At substantially the midpoint of the outer edge of the platform 48, there is attached a downwardly extending rod member 50 of circular cross-section. This rod member extends through an opening in the top of the casing 18 and has its bottom end slidably and rotatably held by a guide 51 mounted on the bottom plate 18a of the casing 18. The engagement of the rod member 50 with the guide member 51 and the top of the casing 18 insures movement of the platform 48 in a substantially vertical path. At one outer corner of the platform 48 there is provided a rod member 52 held in an open-ended slot 48a in this corner of the platform. This rod member extends down through a slot 18f in the casing 18 and has its bottom end positioned on the bottom plate 18a of the casing 18. This rod member 52 serves as a guide to prevent turning of the platform 48 around the first rod member 50. The bottom portion of the rod member 52 is provided with a coil spring 53 extending from the rod member to the guide 51. This spring serves to hold the rod member 52 in engagement with the platform slot 48a to prevent rotation of the platform on its supporting rod 50. In this position the rod member 52 is located at the inner end of the casing slot 18f. The platform 48 is also provided with a second slot 48b on the opposite edge of the platform. The two slots 48a and 48b and the rod 50 are substantially aligned as shown in Fig. 7. The rod member 52 engaging the slot 48a serves with the rod member 50 to cause movement of the platform in a vertical path. The rod member 52 may be disengaged from the slot 48a by pressing outwardly on the top end of the rod member 52. After the rod member has become disengaged from the slot 48a, the platform may be turned on the rod member approximately 180° until the rod member 52 engages the opposite slot 48b. In this position the platform 48 is held in an outwardly extending position so that the stack 49 of paper may be placed on the platform.

In order to cause the platform 48 to move in a vertical path and toward the slide plate 14, there is provided a lever such as an arm 54 having a horizontal portion extending beneath the platform, a vertical portion extending upwardly beside the platform and an outwardly extending horizontal portion 54a located in contact with the adjacent side of the horizontal portion 43a of the arm 43 and extending therebeyond. There is provided a screw 55 extending through the arm portion 54a and held in the other arm portion 43a. The arm portion 54a is provided with a slot 54b extending around the screw 55 and through the bottom surface of the arm portion 54a. This slot engages the screw 55 when the parts are in the position shown in Fig. 5, but permits arm portion 43a to drop out of engagement with the arm portion 54a. The end of the arm 54 opposite the horizontal arm portion 54a is provided with a bracket 54c having a slot 54d embracing the rod member 50. At the top and bottom of the bracket there are provided a pair of annular rubber bumpers 54e, with the bracket 54c and bumpers 54e being freely slidable on the rod member 50. The bumpers serve to reduce noise and vibration in the apparatus and the bottom bumper 54e serves as a support for the corresponding end of arm 54.

The arm 54 is urged downwardly by means of a resilient means such as a spring 58 having one end attached to the arm portion 54a at a point adjacent the outer end thereof and the other end attached to a rod 59 fastened to the bottom plate 18a of the casing 18. The extreme end of the arm portion 54a normally abuts against a button 60 of rubber or other resilient material, with this button also being used to absorb shock and reduce noise and support the corresponding end of arm 54.

In order to cause movement of the arms 43 and 54 and thus of the knock-out member 41 and platform 48, there is provided an actuating member 61 attached to the arm portion 43a by means of a screw bolt 44b. This actuating member 61, as shown, is a rod that is slidably held in an enlarged portion 18e of the casing 18 and is vertically movable therein. The bottom of the actuating member 61 rests against the periphery of the cam plate 29. The cam plate, with notch 29a and raised portion 29b, serves as a timing device for operating the actuating member 61.

In order to remove the molded article, such as a ground meat patty, from the device there is provided a removing apparatus which includes a conveyor means such as a flexible transfer sheet 62 which may be of cloth impregnated with wax or other sealing and non-absorbent material, and is preferably similar to that shown in my prior Patent 2,338,939. One end of this sheet is held by means of a removable pin 63 extending through a loop 62a provided in the one end of the sheet 62. This removable pin 63 is held in a bracket 64 having a top portion located above the slide plate 14 and provided with a downwardly extending leg 64a located at one side of the slide plate 14 and attached to the top surface of the casing 18. As shown, the top portion of the bracket is provided with a cut out portion 64b to provide room for the loop 62a and the part of the pin 63 held within the loop. The flexible sheet 62 and the part of the slide plate 14 which is adjacent thereto and which will be over the platform 48 when the mold plate has moved furthest to the right (Fig. 1) serves as a back stop.

The flexible sheet 62 extends from the pin 63 around the adjacent end of the slide plate 14. When the slide plate is in the position shown in the drawings, this end of the sheet 62 passes around the adjacent end of the slide plate 14. This end of the sheet 62 is provided with a reinforcing member 62b. Extending from the lower end of the sheet 62 are a pair of coil springs 65 with each spring being attached adjacent a corner of the sheet 62. Each of these springs 65 extends back along the slide plate 14 and has the other end removably held on a post 66. Each post 66 is mounted on one of the brackets 10c of the hopper 10. When the slide plate 14 is in the position shown in the drawings, the spring 65 will be extended as shown. When the slide plate is moved toward the mold 10 to bring the mold opening 14a under the hopper opening 10a, the spring 65 will pull the sheet 62 back to a position where it covers the end of the slide plate that is directly above the platform 48.

The device is so proportioned that when the slide plate is in the position shown in the drawings, the feeders 17 are turned back to a position where the ram portions 17a are furthest from the mold opening 10a and the arms 24, 25 and 26 have been moved to the left as shown in Fig. 3. In this position the actuating member 61 is just ready to drop down in the notch 29a on further movement of the cam plate 29 in a counterclockwise direction as viewed in Fig. 4.

In operating the device the hopper 10 is filled with a plastic material such as ground meat. The electrical circuit to the motor 19 is closed by operating the switch 67. The motor 19 causes the cam plate 29 to operate counterclockwise (Fig. 4) thus dropping the actuating member 61 into the notch 29a. The dropping of the actuating member causes the knock-out member 41 to be pulled sharply downwardly under the urging of spring 46. The knock-out member enters the mold opening 14a and dislodges the portion of plastic material that is held therein. Further movement of the cam plate 29 causes the actuating member 61 to raise the knock-out member 41 from the mold opening. This portion of plastic material falls onto the topmost sheet of paper of the stack 49. Further operation of the motor 19 rotates the drive member 23 and urges arms 24, 25 and 26 to the right as shown in Fig. 3. Because of the provision of the notch 26a in the outer end of arm 26, there is a period during which the slide plate 49 is not moved. This period is sufficient for the knock-out member 41 to be raised from the mold opening 14a. As the drive member 23 continues to rotate, the arms 24, 25 and 26 are forced rearwardly and pull the slide plate rearwardly until the drive member 23 is in a position substantially diametrically opposite that shown in Fig. 3 and the mold opening 14a is in communication with the hopper opening 10a.

During this operation of the motor, the cam plate 29 is rotated so that the end of the leg 30a of the linkage member 30 that is attached to the cam plate is moved downwardly. This downward movement applies tension to the springs 31 and thus to the lever 40 to cause rotation of the lever in a counterclockwise direction, as shown in Fig. 4. The rotation of the lever 40 causes rotation of the first gear 35 to which the lever is operatively attached. The rotation of the first gear 35 causes rotation of the second gear 36 with which the first gear 35 is in meshing engagement. As the second gear 36 is considerably smaller than the first gear 35, the second gear operates at a faster rate and through a greater arc than does the first gear 35. The rotation of the second gear 36 causes rotation of the meshing third and fourth gears 37 and 38, respectively. As gears 36 and 37 are rigidly mounted on shaft 16b and gear 38 is mounted on its shaft 16a, these movements of the gears cause the feeders 17 to be rotated so that the ram portions 17a move inwardly toward each other and downwardly toward the mold opening 10a. When the movement of the feeders is relatively free, as happens when only a small supply of plastic material is in the hopper 10, the feeders are in the position shown by dotted lines in Fig. 3 at the end of their movement. Because of the provision of the springs 31, however, additional resistance caused by large and compact supplies of plastic material, or other factors, will cause the feeders to move to a position short of that shown by these dotted lines. Sufficient pressure is applied to the plastic material at all times, however, irrespective of the amount of resistance encountered. The springs are of such strength to insure this pressure being applied. The feeders 17 will be turned to their extreme inward position when the end of the leg 30a that is attached to the cam plate 29 is in a position approximately diametrically opposite to that shown in Fig. 4. Further operation of the cam plate causes the feeders to be returned to their initial position. This returning is insured by the leg 30a abutting against the adjacent end of the bar 32 which is attached to the opposite leg 30b.

After the portion of plastic material has been forcibly ejected from the mold opening 14a by the action of the knock-out member 41, the portion of material is pressed against the plate portion 14b and the sheet 62 that form a part of the back stop so that it adheres thereto. This adherence is caused by pressure of the platform 48 through the stack 49 of paper. In order to accomplish this the platform 48 is raised until the portion is pressed between the stack of paper and the flexible sheet 62, which is now backed up by the adjacent end of the slide plate 14. This adjacent end and the sheet 62 thus form a back stop against which the portion of plastic material is pressed. In order to bring about this pressure the rotation of the cam plate 29 causes the actuating member 61 to be forced upwardly. This upward movement of the actuating member 61 is caused by engagement of the bottom of the actuating member with the raised portion 29b of the cam plate 29. Upward movement of the actuating member 61 causes both the knock-out arm 43 and the platform arm 54 to be raised upwardly because of engagement of the slot 54b with the screw 55 that is held in the knock-out arm portion 43a. As the arm 54 moves upwardly, the outer end thereof, which bears against the bottom of the platform 48 through the top bumper 54e, rotates around the screw 55 and raises the platform 48 so that the portion of plastic material is pressed between the stack 49 of paper and the bottom of the slide plate 14. Although the thickness of the stack 49 of paper will vary, the pressure on the portion of the material will be constant because of the provision of the spring 58. This spring is of such a strength that when the pressure on the portion of the material begins to exceed a predetermined maximum the spring will stretch and permit the end portion 54a of the arm 54 to raise from the rubber button 60. During this action the portion of material is usually but not necessarily flattened. It may be flattened to any desired degree by regulating the strength of spring 58. This principal reason for pressing the portion of plastic material against the sheet 62 is to cause the portion to adhere thereto so that it can be removed from the apparatus.

In each downward and upward movement of the actuating member 61 caused by its engagement with the notch 29a and the raised portion 29b, respectively, the screw 55 will disengage and engage the slot 54b. This slot permits the arm portion 43a to fall below the arm portion 54a when the knock-out portion 41 is being operated.

Each time the slide plate 14 moves to the right (Fig. 3) preparatory to raising the platform 48, the springs 65 cause the flexible sheet 62 to be drawn over the end of the plate 14 adjacent the flexible sheet. Thus by the time the portion of material has been raised by the platform to the slide plate 14, the flexible sheet 62 is in position to receive the portion of material. This portion of material is sufficiently adhesive, especially when the material is ground meat, to adhere to the flexible sheet 62 and also the top most sheet of paper in the stack 49 of paper. This topmost sheet remains adhered to the portion of material when the platform 48 is lowered. Subsequent movement of the slide plate 14 to the left (Fig. 3) causes the flexible sheet 62 to be withdrawn to the position shown in Fig. 3. As the sheet 62 is pulled around its end of the slide plate 14, the adhered patty is dislodged from the sheet 62. The patty is thus withdrawn from on top of the stack 49 and falls onto a support (not shown) with the adhered sheet of paper still attached thereto. With this arrangement, operation of the device causes patties of plastic material such as ground meat to be stacked one on top of the other with each portion being separated by a sheet of paper.

The device is so arranged that the platform 48 is held in raised position until the portion of material and the adhered sheet of paper is almost completely withdrawn from the top of the stack 49 of paper. This operation is provided for by making the raised portion 29b of the cam plate 29 of relatively great length as shown, for example, in Fig. 4. Such operation is of great advantage as it prevents accidental dislodgement of the portion of material from the flexible sheet 62 with subsequent fouling of the device.

In order that the paper sheets may be withdrawn easily from the stack 49, each sheet is provided with two slits 49a extending substantially parallel to each other and outwardly to the edge of the paper that is nearest the center of the device. These slits are substantially parallel to the direction of motion of the slide plate 14 and the flexible sheets 62. The stack of paper is held in position by means of a pair of bolts 68, with each bolt engaging openings at the inner end of aligned slits 49a on the stack of paper. These bolts are sufficient to prevent the stack of paper from becoming accidentally dislodged but permits each sheet of paper to be successively withdrawn from the stack beginning with the topmost sheet.

As can be seen from the above description, the device of this invention operates continuously to mold patties of plastic material. After these patties are molded they are ejected from the device in such a manner as to be arranged in a stack at the side of the device. This device may be used for molding any plastic material, but is particularly adapted for molding and shaping patties of ground meat such as hamburger. As all the operating parts of the device are interrelated, the device is simple to construct so that the proper timing is achieved. Thus the mold opening 14a is always in communication with the hopper opening 10a during the time when the feeders 17 are forcing plastic material out the opening 10a. The mold opening 14a is always under the knockout member 41 during engagement of the actuating member 61 with the notch 29a in the cam plate 29. Similarly, the slide plate 14 is at rest with the mold opening 14a in communication with the hopper opening 10a during the time the portion of plastic material is being pressed between the stack 49 of paper and the back stop which includes the flexible sheet 62.

This application is related to my copending application Serial No. 82,419, filed March 19, 1949, which claims certain elements of the device described herein.

While I have shown and described certain embodiments of my invention, it is to be understood that it is capable of many modifications. Changes, therefore, in the construction and arrangement may be made without departing from the spirit and scope of the invention as described in the appended claims.

I claim:

1. A device for molding a patty from plastic material, said device comprising: a hopper for the plastic material; a mold adapted to receive a portion of plastic material from said hopper; a supporting member adjacent the mold; apparatus adjacent the mold for transferring said portion from the mold to the supporting member; a back stop adjacent the supporting member; apparatus providing relative movement between the supporting member and back stop with said portion therebetween; a single actuating member operatively engaging both the transferring apparatus and the moving apparatus; and apparatus including a timing device for operating the actuating member to actuate said transferring apparatus and then again operating the actuating member to actuate said moving apparatus.

2. A device for molding a patty from plastic material, said device comprising: a hopper for the plastic material; a mold adapted to receive a portion of plastic material from said hopper; a supporting member adjacent the mold; apparatus adjacent the mold for transferring said portion from the mold to the supporting member; a back stop adjacent the supporting member; apparatus providing relative movement between the supporting member and back stop with said portion therebetween; a single actuating member operatively engaging both the transferring apparatus and the moving apparatus and movable in one direction to operate the transferring apparatus and in the opposite direction to operate the moving apparatus; and apparatus including a timing device operatively connected to the actuating member for first moving the actuating member in said one direction and then in said opposite direction.

3. A device for molding a patty from plastic material, said device comprising: a hopper for the plastic material; a mold adapted to receive a portion of plastic material from said hopper;

a supporting member adjacent the mold; apparatus adjacent the mold for transferring said portion from the mold to the supporting member; resilient means urging said transferring apparatus from a non-operative to an operative position for causing said transferring; a back stop adjacent the supporting member; apparatus providing relative movement between the supporting member and back stop with said portion therebetween; a single actuating member operatively engaging both the transferring apparatus and the moving apparatus, said actuating member being movable in one direction to release the transferring apparatus for said movement under the urging of said resilient means and being movable in the opposite direction to operate said moving apparatus; and apparatus including a timing device operatively connected to the actuating member for first moving the actuating member in said one direction and then in said opposite direction.

4. A device for molding a patty from plastic material, said device comprising: a hopper for the plastic material; a mold adapted to receive a portion of plastic material from said hopper; a supporting member adjacent the mold; apparatus adjacent the mold for transferring said portion from the mold to the supporting member; resilient means urging said transferring apparatus from a non-operative to an operative position for causing said transferring; a back stop adjacent the supporting member; apparatus providing relative movement between the supporting member and back stop with said portion therebetween; a single actuating member operatively engaging both the transferring apparatus and the moving apparatus, said actuating member being movable in one direction to release the transferring apparatus for said movement under the urging of said resilient means and being movable in the opposite direction to operate said moving apparatus; a generally circular cam plate engaging one end of said actuating member for holding the actuating member against the urging of said resilient means, said cam plate having a depression in one part of its periphery to release the actuating member for movement in said one direction and a raised portion in another part of said periphery for then moving said actuating member in said other direction; and means operably associated with the cam plate for rotating said cam plate.

5. A device for molding a patty from a plastic material, said device comprising: a hopper for the plastic material; a movable mold having an opening therethrough adapted to communicate with said hopper to receive a portion of plastic material from said hopper; a supporting member spaced from the hopper; apparatus for moving the mold away from said hopper to a position where said opening is over said supporting member and back again; apparatus adjacent the supporting member for transferring said portion from the mold to the supporting member including a knock-out member arranged in position above said opening when the opening is over the supporting member; resilient means urging said knock-out member from said position into engagement with said portion for removing the portion from said opening and causing the portion to fall onto the supporting member; a back stop positioned above said supporting member when said portion is arranged on the supporting member; apparatus for moving at least one of the supporting members and back stop toward the other with said portion therebetween; a single actuating member operatively engaging both the transferring apparatus and the moving apparatus, said actuating member being movable in one direction to release the transferring apparatus for said movement under the urging of said resilient means and being movable in the opposite direction to operate said moving apparatus; and apparatus including a timing device for first moving the actuating member in said one direction and then in said opposite direction.

6. Apparatus for molding a patty from a plastic material, said device comprising: a hopper for the plastic material; a movable mold having an opening therethrough adapted to communicate with said hopper to receive a portion of plastic material from said hopper; a supporting member spaced from the hopper; a lever beneath the supporting member and having an end portion extending outwardly therefrom; apparatus for moving the mold away from said hopper to a position where said opening is over said supporting member and back again; apparatus adjacent the supporting member for transferring said portion from the mold to the supporting member including a knock-out member arranged in position above said opening when the opening is above the supporting member; a lever extending from said knock-out member and having an end arranged adjacent said end of the supporting member lever; resilient means urging said knock-out member from said position into engagement with said portion for removing the portion from said opening and causing the portion to fall onto the supporting member; a back stop positioned above said supporting member when said portion is arranged on the supporting member; apparatus providing relative movement between the supporting member and back stop with said portion therebetween; a single actuating member operatively engaging said ends of said levers, said actuating member being movable in one direction to release the transferring apparatus for said movement under the urging of said resilient means and being movable in the opposite direction to operate said moving apparatus; a generally circular cam plate engaging one end of said actuating member for holding the actuating member against the urging of said resilient means, said cam plate having a depression in one part of its periphery to release the actuating member for movement in said one direction and a raised portion in another part of said periphery for moving said actuating member in said other direction; and means operably associated with the cam plate for rotating said cam plate.

7. A device for molding a patty from a plastic material said device comprising: a hopper for the plastic material; a movable mold having an opening therethrough adapted to communicate with said hopper to receive a portion of plastic material from said hopper through the top of said opening and retain the material in said opening; a supporting member spaced from the hopper; a lever beneath the supporting member and having an end portion extending outwardly therefrom; apparatus operatively connected to the mold for moving the mold opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; resilient means urging said knock-out member downwardly from said position above the opening into engagement with said portion within the opening for removing said portion from the opening and causing the portion to fall onto the supporting member; apparatus operably associated with the mold for moving said mold opening from over said supporting member; a back stop positioned above said supporting member when said portion is arranged on the supporting member; a single actuating member operatively engaging both the knock-out lever and the supporting member lever, said actuating member normally holding said knock-out member above the path of movement of the mold against the urging of said resilient means and holding the supporting member spaced below said path; means for lowering the actuating member to permit said engagement of the knock-out member with said portion under the urging of said resilient means and for again raising said knock-out member to said normal position; and means for subsequently raising said actuating member above its normal position to raise the supporting member and press said portion between the supporting member and the back stop.

8. A device for molding a patty from a plastic material, said device comprising: a hopper for the plastic material; a movable mold having an opening therethrough adapted to communicate with said hopper to receive a portion of plastic material from said hopper through the top of said opening and retain the material in said opening; a supporting member spaced from the hopper; a lever beneath the supporting member and having an end portion extending outwardly therefrom; apparatus operatively connected to the mold for moving the mold opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; resilient means urging said knock-out member downwardly from said position above the opening into engagement with said portion within the opening for removing said portion from the opening and causing the portion to fall onto the supporting member; apparatus operably associated with the mold for moving said mold opening from over said supporting member; a back stop positioned above said supporting member when said portion is arranged on the supporting member; a single actuating member operatively engaging both the knock-out lever and the supporting member lever, said actuating member normally holding said knock-out member above the path of movement of the mold against the urging of said resilient means and holding the supporting member spaced below said path; and a single rotatable means engaging said actuating member and having a depressed portion for lowering the actuating member to permit said engagement of the knock-out member with said portion under the urging of said resilient means and for again raising said knock-out member to said normal position; and having a raised portion for subsequently raising said actuating member above its normal position to raise the supporting member and press said portion between the supporting member and the back stop.

9. A device for molding a patty from a plastic material, said device comprising: a hopper for the plastic material; a movable mold having an opening therethrough adapted to communicate with said hopper to receive a portion of plastic material from said hopper through the top of said opening and retain the material in said opening; a supporting member spaced from the hopper; a lever beneath the supporting member and having an end portion extending outwardly therefrom; apparatus operatively connected to the mold for moving the mold opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; resilient means urging said knock-out member downwardly from said posiiton above the opening into engagement with said portion within the opening for removing said portion from the opening and causing the portion to fall onto the supporting member; apparatus operably associated with the mold for moving said mold opening from over said supporting member; a back stop positioned above said supporting member when said portion is arranged on the supporting member; a single actuating member operatively engaging both the knock-out lever and the supporting member lever, said actuating member normally holding said knock-out member above the path of movement of the mold against the urging of said resilient means and holding the supporting member spaced below said path; and a generally circular cam plate engaging the bottom of said actuating member and having a depressed portion for lowering the actuating member to permit said engagement of the knock-out member with said portion under the urging of said resilient means and for again raising said knock-out member to said normal position, and having a raised portion for subsequently raising said actuating member above its normal position to raise the supporting member and press said portion between the supporting member and the back stop.

10. A device for molding a patty from a plastic material, said device comprising: a hopper for the plastic material; a movable mold having an opening therethrough adapted to communicate with said hopper to receive a portion of plastic material from said hopper through the top of said opening and retain the material in said opening; a supporting member spaced from the hopper; a lever beneath the supporting member and having an end portion extending outwardly therefrom; apparatus operatively connected to the mold for moving the mold plate opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; resilient means urging said knock-out member downwardly from said position above the opening into engagement with said portion within the opening for removing said portion from the opening and causing the portion to fall onto the supporting member; apparatus operably associated with the mold for moving said mold plate opening from over said supporting member to a position for again receiving a portion of material from said hopper, said mold plate having a portion thereof located over said supporting member when the mold opening is in said material-receiving position; a single actuating member operatively engaging both the knock-out lever and the supporting member lever, said actuating member normally holding said knock-out member above the path of movement of the mold plate against the urging of said resilient means and holding the supporting member spaced below said path; means for lowering the actuating member to permit said engagement of the knock-out member with said portion under the urging of said resilient means and for again raising said knock-out member to said normal position; and means operably associated with the actuating member for subsequently raising said actuating member above its normal position to raise the supporting member toward the portion of mold plate that is thereover and press said portion therebetween.

11. A device for molding a patty from a plastic material, said device comprising: a hopper for the plastic material; a movable mold having an opening therethrough adapted to communicate with said hopper to receive a portion of plastic material from said hopper through the top of said opening and retain the material in said opening; a supporting member spaced from the hopper; a lever beneath the supporting member and having an end portion extending outwardly therefrom; apparatus operatively connected to the mold for moving the mold opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; said levers being releasably attached together to permit separation of said levers only when the knock-out lever is moved downwardly; resilient means urging said knock-out member downwardly from said position above the opening into engagement with said portion within the opening for removing said portion from the opening and causing the portion to fall onto the supporting member; apparatus operably associated with the mold for moving said mold opening from over said supporting member; a back stop positioned above said supporting member when said portion is arranged on the supporting member; a single actuating member attached to the knock-out lever and extending downwardly therefrom; means for lowering the actuating member to permit said engagement of the knock-out member with said portion under the urging of said resilient means and for again raising said knock-out member to said normal position; and means operably associated with the actuating member for subsequently raising said actuating member above its normal position to raise the supporting member and press said portion between the supporting member and the back stop.

12. A device for molding a patty from a plastic material, said device comprising: a hopper for the plastic material; a movable mold plate having an opening therethrough adapted to communicate with said hopper to receive a portion of plastic material from said hopper through the top of said opening and retain the material in said opening; a supporting member spaced from the hopper; a lever arranged beneath the supporting member and having an end portion extending outwardly therefrom; apparatus operatively connected to the mold for moving the mold plate opening away from said hopper to a position where said opening is directly above said supporting member and back again; a knock-out member normally arranged in position above said opening when the opening is above the supporting member; a lever extending from the knock-out member and having an end arranged adjacent to said end of the supporting member lever, said levers being releasably attached together to permit separation of said levers only when the knock-out lever is moved downward, the outer end of said supporting member lever extending beyond the other lever; resilient means urging said knock-out member downwardly from said position above the opening into engagement with said portion within the opening for causing the portion to fall onto the supporting member; apparatus for moving said mold opening from over said supporting member to a position for again receiving a portion of material from said hopper, said mold plate having a portion thereof located over said supporting member when the mold opening is in material-receiving position; a single actuating member attached to the knock-out lever and extending downwardly therefrom, said actuating member normally holding said knock-out member above the mold plate against the urging of said resilient means and permitting the supporting member to be spaced below said path; second resilient means attached to the end of the supporting member lever beyond the point of attachment of said supporting member lever and the knock-out lever and urging the supporting member lever downwardly; a generally circular cam plate engaging the bottom of said actuating member and having a depressed portion for periodically lowering the actuating member to permit said engagement of the knock-out member with said portion under the urging of said first resilient means, and having a raised portion for subsequently and periodically raising said actuating member above its normal position toward the portion of mold plate that is thereover and flatten said plastic material portion; means for rotating said cam plate; and means supporting the ends of said supporting member lever on opposite sides of said resilient means to prevent lowering said lever when the actuating member is lowered.

13. A device for molding a patty from a plastic material, said device comprising: a hopper for the plastic material; a movable mold having an opening therethrough adapted to communicate with said hopper to receive a portion of plastic material from said hopper through the top of said opening and retain the material in said opening; a supporting member having a plurality of supporting sheets arranged in a stack thereon and spaced from the hopper; a lever beneath the supporting member and having an end portion extending outwardly therefrom; apparatus operatively connected to the mold for moving the mold opening away from said hopper to a position where said opening is directly above said supporting member and back again; a knock-out member normally arranged in position above said opening when the opening is above the supporting member; a lever extending from the knock-out member and having an end arranged adjacent said end of the supporting member lever; resilient means urging said knock-out member downwardly from said position above the opening into engagement with said portion within the opening for removing said portion from the opening and causing the portion to fall onto the topmost sheet of the supporting member; apparatus operably associated with the mold for moving said mold opening from over said supporting member; a back stop positioned above said supporting member when said portion is arranged on the supporting member; a single actuating member operatively engaging both the knock-out lever and the supporting member lever, said actuating member normally holding said knock-out member above the path of movement of the mold against the urging of said resilient means and holding the supporting member spaced below said path; means for lowering the actuating member to permit said engagement of the knock-out member with said portion under the urging of said resilient means and for again raising said knock-out member to said normal position; means for subsequently raising said actuating member above its normal position to raise the topmost sheet of the supporting member and press said portion between the supporting member and the back stop; and means for ejecting said portion and said adhered sheet including a movable means forming a part of the back stop and to which said patty adheres.

14. A device for molding a patty from a plastic material, said device comprising: a hopper for the plastic material; a movable mold plate having an opening therethrough adapted to receive a portion of plastic material from said hopper through the top of said opening and retain the material in said opening; a supporting member spaced from the hopper and having a plurality of supporting sheets arranged thereon in a stack, said sheets being loosely retained on said supporting member for individual removal therefrom; a lever arranged beneath the supporting member and having an end portion extending outwardly therefrom; apparatus for moving the mold plate opening away from said hopper to a position where said opening is directly above said supporting member and back again; a knock-out member normally arranged in position above said opening when the opening is above the supporting member; a lever extending from the knock-out member and having an end arranged adjacent to said end of the supporting member lever, said levers being releasably attached together to permit separation of said levers only when the knock-out lever is moved downwardly, the outer end of the supporting member lever extending beyond the other lever; resilient means urging said knock-out member downwardly from said portion above the opening into engagement with said portion within the opening for causing the portion to fall onto the topmost sheet on said supporting member; apparatus for moving said mold opening from over said supporting member to a position for again receiving a portion of material from said hopper, said mold plate having a portion thereof located over said supporting member when the mold opening is in material-receiving position and forming a part of a back stop; a single actuating member attached to the knock-out lever and extending downwardly therefrom, said actuating member normally holding said knock-out member above the mold plate against the urging of said resilient means and permitting the supporting member to be spaced below said mold plate; second resilient means attached to the end of the supporting member lever beyond the point of attachment of said supporting member lever and the knock-out lever and urging the supporting member lever downwardly; a generally circular cam plate engaging the bottom of said actuating member and having a depressed portion for periodically lowering the actuating member to permit said engagement of the knock-out member with said portion under the urging of said first resilient means, and having a raised portion for subsequently and periodically raising said actuating member above its normal position toward the portion of mold plate that is thereover and press said portion therebetween, said second resilient means causing the end of said supporting member lever adjacent the supporting member to be raised upwardly to raise the member while retaining the outer end of the lever in fixed position until a predetermined pressure depending on the resistance of said resilient means has been applied to said portion of plastic material; means for ejecting said portion and said adhered sheet including a movable conveyor means forming a part of said back stop and to which said patty adheres; means for rotating said cam plate; and means supporting the ends of said supporting member lever on opposite sides of said second resilient means to prevent lowering of said lever when the actuating member is lowered.

HARRY H. HOLLY.

REFERENCES CITED

The following references are of record in the file of this patent:

UNITED STATES PATENTS

| Number | Name | Date |
| --- | --- | --- |
| 2,338,939 | Holly | Jan. 11, 1944 |